(12) United States Patent
Wang et al.

(10) Patent No.: US 7,498,581 B2
(45) Date of Patent: Mar. 3, 2009

(54) DISTRIBUTED ITERATIVE IMAGE RECONSTRUCTION

(75) Inventors: Wenli Wang, Aurora, OH (US); Zhiqiang Hu, Highland Heights, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 156 days.

(21) Appl. No.: 11/383,831

(22) Filed: May 17, 2006

(65) Prior Publication Data

US 2007/0075249 A1 Apr. 5, 2007

Related U.S. Application Data

(60) Provisional application No. 60/596,588, filed on Oct. 5, 2005.

(51) Int. Cl.
G01T 1/166 (2006.01)
(52) U.S. Cl. .................... 250/363.04; 378/901
(58) Field of Classification Search ............... 250/250, 250/363.04; 378/4, 901
See application file for complete search history.

(56) References Cited

U.S. PATENT DOCUMENTS

| 4,559,597 A * | 12/1985 | Mullani .................. 600/407 |
| 5,253,171 A | 10/1993 | Hsiao et al. |
| 5,625,190 A * | 4/1997 | Crandall ................ 250/363.03 |
| 5,654,820 A * | 8/1997 | Lu et al. ................. 359/298 |
| 6,628,983 B1 * | 9/2003 | Gagnon ..................... 600/431 |
| 6,907,099 B2 | 6/2005 | King et al. |
| 7,057,178 B1 | 6/2006 | Manjeshwar et al. |
| 2006/0097175 A1 | 5/2006 | Ganin et al. |
| 2006/0102845 A1 | 5/2006 | Williams et al. |
| 2006/0138315 A1 | 6/2006 | Williams et al. |
| 2006/0145082 A1 | 7/2006 | Steams et al. |
| 2006/0163485 A1 | 7/2006 | Steams et al. |

OTHER PUBLICATIONS

Shepp, L.A., et al.; Maximum Likelihood Reconstruction for Emission Tomography; 1982; IEEE Trans. Med. Imaging; vol. MI-2; pp. 113-122.
Byrne, C.L.; Accelerating the EMML Algorithm and Related Iterative Algorithms by Rescaled Block-Iterative Methods; 1998; IEEE Trans. Image Processing; 7(1)100-109.
Browne, J., et al.; A Row-Action Alternative to the EM Algorithm for Maximizing Likelihoods in Emission Tomography; 1996; IEEE Trans. Med. Imaging; 15(5)687-699.
Alessio, et al., PET Image Reconstruction, date unknown, pp. 1-22, Department of Radiology, University of Washington, Seattle, Washington, www.depts.washington.edu/nucmed/IRL/pims/2005/05/25/alessioPETRecon.pdf.
Chen, et al., Parallelization of the EM Algorithm for 3-D PET Image Reconstruction, IEEE Transaction on Medical Imaging, Dec. 1991, pp. 513-522, vol. 10, No. 4.
Chen, et al., On Parallelizing the EM Algorithm for PET Image Reconstruction, IEEE Transaction on Parallel and Distributed System, Aug. 1994, pp. 860-873, vol. 5, No. 8.

(Continued)

*Primary Examiner*—David P Porta
*Assistant Examiner*—Mark R Gaworecki (57) ABSTRACT

A method and apparatus for performing an iterative image reconstruction uses two or more processors (130). The reconstruction task is distributed among the various processors (130). In one embodiment, the projection space data (300) is distributed among the processors (130). In another embodiment, the object space (200) is distributed among the processors (130).

28 Claims, 10 Drawing Sheets

OTHER PUBLICATIONS

Chen, et al., An Efficient Parallel Architecture for 3D PET Image Reconstruction, International Conference on Signal Processing, Oct. 1996, pp. 910-913, vol. 2.

Desjardins, et al., Parallel Approach to Interative Tomographic Reconstruction for High Resolution PET Imaging, IEEE Nuclear Science Symposium, Nov. 1997, pp. 1551-1555, vol. 2.

Jeng, et al., A Component-based Parallel PET Image Reconstruction Visual System, International Workshop on Medical Imaging and Augmented Reality, Jun. 2001, pp. 247-252.

Hudson and Larkin, Accelerated Image Reconstruction Using Ordered Subsets of Projection Data, IEEE Trans. Med. Imaging, vol. 13, No. 4, pp. 601-609 (1994).

* cited by examiner

MATCH TO FIG. 4B

DISTRIBUTED ITERATIVE IMAGE RECONSTRUCTION

CROSS REFERENCE TO RELATED APPLICATIONS

This application claims the benefit of U.S. provisional application Ser. No. 60/596,588 filed Oct. 5, 2005, which is incorporated herein by reference.

BACKGROUND

The present invention relates to the field of positron imaging, and more particularly to the reconstruction of data acquired in positron emission tomography (PET). It also finds application to the reconstruction of data acquired in single photon emission computed tomography (SPECT), computed tomography (CT), and other applications where the reconstruction of acquired data is required.

Positron emission tomography (PET) is a branch of nuclear medicine in which a positron-emitting radiopharmaceutical such as $^{18}$F-fluorodeoxyglucose (FDG) is introduced into the body of a patient. As the radiopharmaceutical decays, positrons are generated. More specifically, each of a plurality of positrons reacts with an electron in what is known as a positron annihilation event, thereby generating a coincident pair of 511 keV gamma rays which travel in opposite directions along a line of response (LOR). A gamma ray pair detected within a coincidence time is ordinarily recorded by the PET scanner as an annihilation event. In time of flight (TOF) imaging, the time within the coincidence interval at which each gamma ray in the coincident pair is detected is further measured. The time of flight information provides an indication of the location of the detected event along the LOR.

In three-dimensional PET, a four-dimensional projection sinogramn or event list is acquired. In many cases, the region of interest in the object under examination has a longer longitudinal dimension than the scanner's axial field of view. Thus, data is often acquired in a frame-based or step and shoot mode in which data is acquired with the object support and hence the object located at each of a plurality of discrete longitudinal positions. In a continuous mode, the object support is moved substantially continuously during the acquisition.

Data from the scan is used to reconstruct volumetric data indicative of the distribution of the radionuclide in the object. Reconstruction is typically performed using statistical (iterative) or analytical reconstruction algorithms. Iterative reconstruction techniques include the maximum likelihood expectation maximization (ML-EM), ordered subsets expectation maximization (OS-EM), rescaled block iterative expectation maximization (RBI-EM), and row action maximization likelihood (RAMLA) techniques. See Shepp and Vardi, *Maximum Likelihood Reconstruction for Emission Tomography*, IEEE Trans. Med. Imaging vol. MI-2, pp 113-122 (1982); Hudson and Larkin, *Accelerated Image Reconstruction Using Ordered Subsets of Projection Data*, IEEE Trans. Med. Imaging vol. 13, no. 4, pp 601-609 (1994); Byrne, *Accelerating the EMML Algorithm and Related Iterative Algorithms by Rescaled Block-Iterative Methods*, IEEE Trans. Image Processing, vol. 7, no. 1 pp. 100-109 (1998); Brown and DePierro, *A Row-Action Alternative to the EM Algorithm for Maximizing Likelihoods in Emission Tomography*, IEEE Trans. Med. Imaging vol. 15, no. 5, pp 687-699 (1996). While iterative methods can provide a superior reconstruction, they are as a rule more complex, computationally more expensive, and relatively more time consuming.

As a result, reconstruction time can be a key factor in the performance of PET imaging systems. This is especially true when iterative reconstruction techniques are used, and even more so when data is acquired with the object located at multiple longitudinal positions.

One technique for accelerating the convergence of an iterative reconstruction and thereby reducing reconstruction time has been the use of subsets. As a practical matter, however, there is a limit to the number of subsets that can be used without sacrificing reconstruction quality. See, e.g., *PET Image Reconstruction*, Alessio and Kinahan, Department of Radiology, University of Washington, Seattle, Wash., www.depts.washington.edu/nucmed/IRL/pims/2005/05/25/alessioPETRecon.pdf.

To reduce reconstruction time in frame-based imaging, data from each frame or longitudinal position has been provided to different processors in sequence. Thus, data from the first frame has been provided to a first processor; data from the second frame has been provided to a second processor, and so on. Once each processor has processed data, the first processor receives additional data from yet another frame, and the process is repeated. A particular drawback to this technique, however, is that one or more processors can remain idle while waiting for data. Moreover, such a technique is not well suited to continuous acquisition modes, nor is it well suited to concurrent image acquisition and reconstruction.

Still another technique for reducing reconstruction time in iterative reconstruction has been the use of a parallel processing architecture. See, e.g., *On Parallelizing the EM Reconstruction Algorithm for PET Image Reconstruction*, Chen and Lee, IEEE Transactions on Parallel and Distributed Systems, Vol. 5, No. 8, 1994. However, the use of additional processing elements increases system cost and complexity. Accordingly, it is desirable that the available processing resources be used relatively efficiently.

SUMMARY

Aspects of the present invention address these matters, and others.

According to a first aspect of the present invention, a method of reconstructing projection data indicative of a plurality of positron annihilation events includes using a first processor to perform a first portion of a reconstruction of a subset of the projection data and using a second processor ($130_2$) to perform a second portion of the reconstruction of the subset of the projection data. The method also includes using the results of the first and second portions of the reconstruction to update an object estimate, repeating the steps of using a first processor, using a second processor, and using the results for a plurality of subsets, and repeating the step of repeating a plurality of times. The method also includes generating a human readable image indicative to the object estimate.

According to another aspect of the present invention, an apparatus includes a first processor for performing a first portion of a reconstruction of a subset of projection data and a second processor for performing a second portion of the reconstruction of the subset of the projection data. The apparatus includes means for using the results of the first and second portions of the iterative reconstruction to update an object estimate, and means for causing the first and second processors to perform the first and second portions of the reconstructions and for causing the means for using to update the object estimate for a plurality of subsets.

According to another aspect of the invention, an iterative method of reconstructing projection data indicative of detected radiation includes performing a first portion of a reconstruction of a subset of the projection data and performing a second portion of the reconstruction of the subset of the projection data. The steps of performing a first portion and performing a second portion are performed substantially temporally in parallel. The method also includes repeating the steps of performing a first portion and performing the second portion for a plurality of subsets and repeating the step of repeating a plurality of times.

Those skilled in the art will appreciate still other aspects of the present invention upon reading and understanding the appended description.

DESCRIPTION

Figure 1:
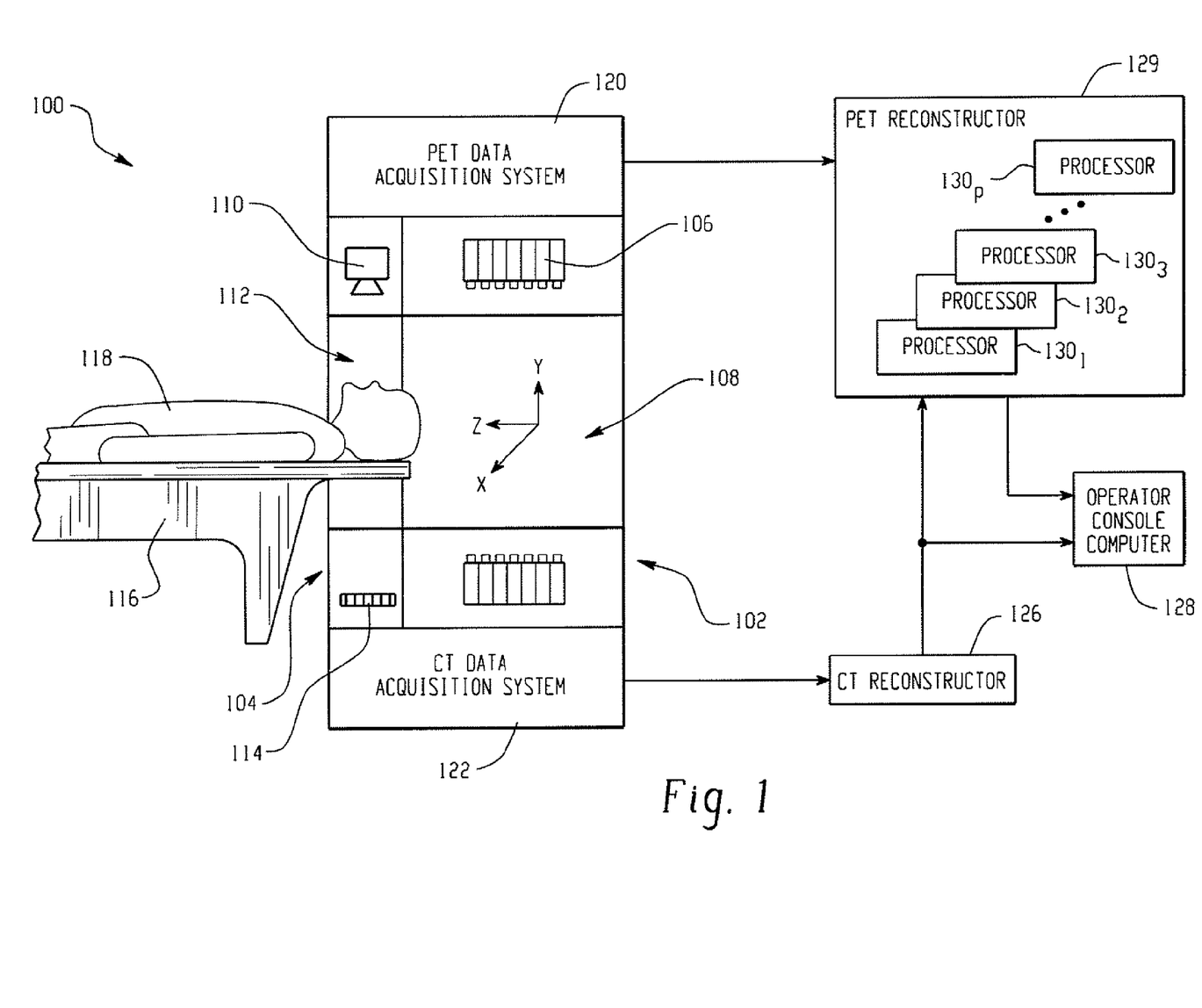
FIG. 1 depicts a combined PET/CT system.

With reference to FIG. 1, a combined PET/CT system 100 includes a PET gantry portion 102 and a CT gantry portion 104. The PET gantry portion 102 includes one or more axial rings of radiation sensitive detectors 106 which surround an examination region 108. The detectors 106 detect gamma radiation characteristic of positron annihilation events occurring within a PET examination region 108.

The CT portion 104 includes a radiation source 110 such as an x-ray tube which rotates about a CT examination region 112. Radiation sensitive detectors 114 detect radiation emitted by the x-ray source which has traversed the examination region 112.

The PET gantry portion 102 and CT gantry portion 104 are preferably located in proximity with their respective examination regions 108, 112 disposed along a common longitudinal or z-axis. An object support 116 supports an object to be imaged 118 such as human patient. The object support 116 is preferably longitudinally movable in coordination with operation of the PET/CT system 100 so that the object 118 can be scanned at a plurality of longitudinal locations by both the PET and CT gantry portions 102, 104.

In a step and shoot or frame-based mode, the object support 116 is moved to a first longitudinal position. Following the acquisition of the desired data, the support 116 is moved to a second longitudinal position, and the desired data obtained. This process is repeated until the desired longitudinal extent of the object 118 has been scanned. In a continuous mode, the object support 116 is moved substantially continuously during scanning.

A CT data acquisition system 122 processes the signals from the CT detectors 114 to generate data indicative of the radiation attenuation along a plurality of lines or rays through the examination region 112. A CT reconstructor 126 reconstructs the data using suitable reconstruction algorithms to generate volumetric image data indicative of the radiation attenuation of the object 118.

PET data acquisition system 120 provides projection data which includes a list of annihilation events detected by the detectors 106. More particularly, the projection data provides information on the LOR for each event, such as a transverse and longitudinal position of the LOR, its transverse and azimuthal angles, and TOF information. Alternately, the data may be rebinned into one or more sinogram or projection bins.

A PET reconstructor 129 includes two or more computers or computer processors $130_1$, $130_2$, $130_3$ . . . $130_p$. In one embodiment, the reconstructor 129 includes a plurality of general purpose computers, each of which includes a plurality of central processing units (CPUs) or processors. In another embodiment, the reconstructor 129 includes a plurality of computers, each containing a single processor. Other suitable architectures utilizing general purpose computers, proprietary computers, dedicated hardware, or otherwise, may also be implemented. Generally speaking, the use of additional or more powerful processors will improve the temporal performance of the reconstructor 129.

As will be described more fully below, the reconstructor 129 uses an iterative technique to generate volumetric image data indicative of the distribution of the radionuclide in the object 118. Suitable techniques include ML-EM, OS-EM, RBI-ME, and RAMLA, although other techniques may be implemented. In addition, the PET reconstructor 129 preferably uses information from the CT reconstructor 126 to apply attenuation and other desired corrections to the PET data. Computer readable instructions which cause the processors $130_1$, $130_2$, $130_3$ . . . $130_p$ to carry out the reconstruction are preferably carried on one or more computer readable media such as computer disks, volatile or nonvolatile memory, or the like, and may also be transmitted by way of a suitable communications network such as the internet to storage media accessible to the processors.

A workstation computer serves an operator console 128. The console 128 includes a human readable output device such as a monitor or display and input devices such as a keyboard and mouse. Software resident on the console 128 allows the operator to view and otherwise manipulate the volumetric image data generated by the PET and CT reconstructors 129, 126. Software resident on the console 128 also allows the operator to control the operation of the system 100 by establishing desired scan protocols, initiating and terminating scans, and otherwise interacting with the scanner.

Variations on the system 100 are also possible. Thus, for example, the CT portion of the scanner may be omitted, located remotely from the PET gantry portion 102, or replaced with another imaging device such as a magnetic resonance (MR) scanner. Alternately, attenuation or anatomical information may be provided by a transmission source associated with the PET gantry portion 102.

The PET reconstructor 129 implements an iterative reconstruction algorithm. Iterative reconstruction can be characterized as including several main steps. Starting with an initial object estimate, an object estimate is forward projected into the projection domain. The resulting projections are compared against the measured projections to form corrections in the projection domain. The corrections are then back-projected into the image domain and used to update the object estimate. The process is repeated until the estimate converges to a solution or the iteration process is otherwise terminated.

One suitable model for an iterative reconstruction algorithm can be expressed as follows:

$$\hat{f}^{k+1} = \hat{f}^k + \frac{\hat{f}^k}{s} H^T Corr(H\hat{f}^k, g)$$ Equation 1 where $\hat{f}^k$ is the emission object estimate at iteration k, and g is the measured projection data. Where list mode reconstruction is performed, g is represented as one (1) for each event in the list, although additional weightings may be applied. H is the system matrix, which models the forward projection process.

Thus, $H\hat{f}^k$ is the forward projection of the object estimate at the $k^{th}$ iteration, and $H^T$ is the backward projection operator. $Corr(H\hat{f}^k, g)$ is the correction factor in the projection space, which is a function of $H\hat{f}^k$ and g; s is the sensitivity image, which is usually modeled as $H^T 1$, i.e., the back-projection of the unit projection.

As will be appreciated, the foregoing model is applicable to a variety of iterative reconstruction methods, including the ML-EM, OS-EM, RBI-EM, and RAMLA methods.

Figure 7:
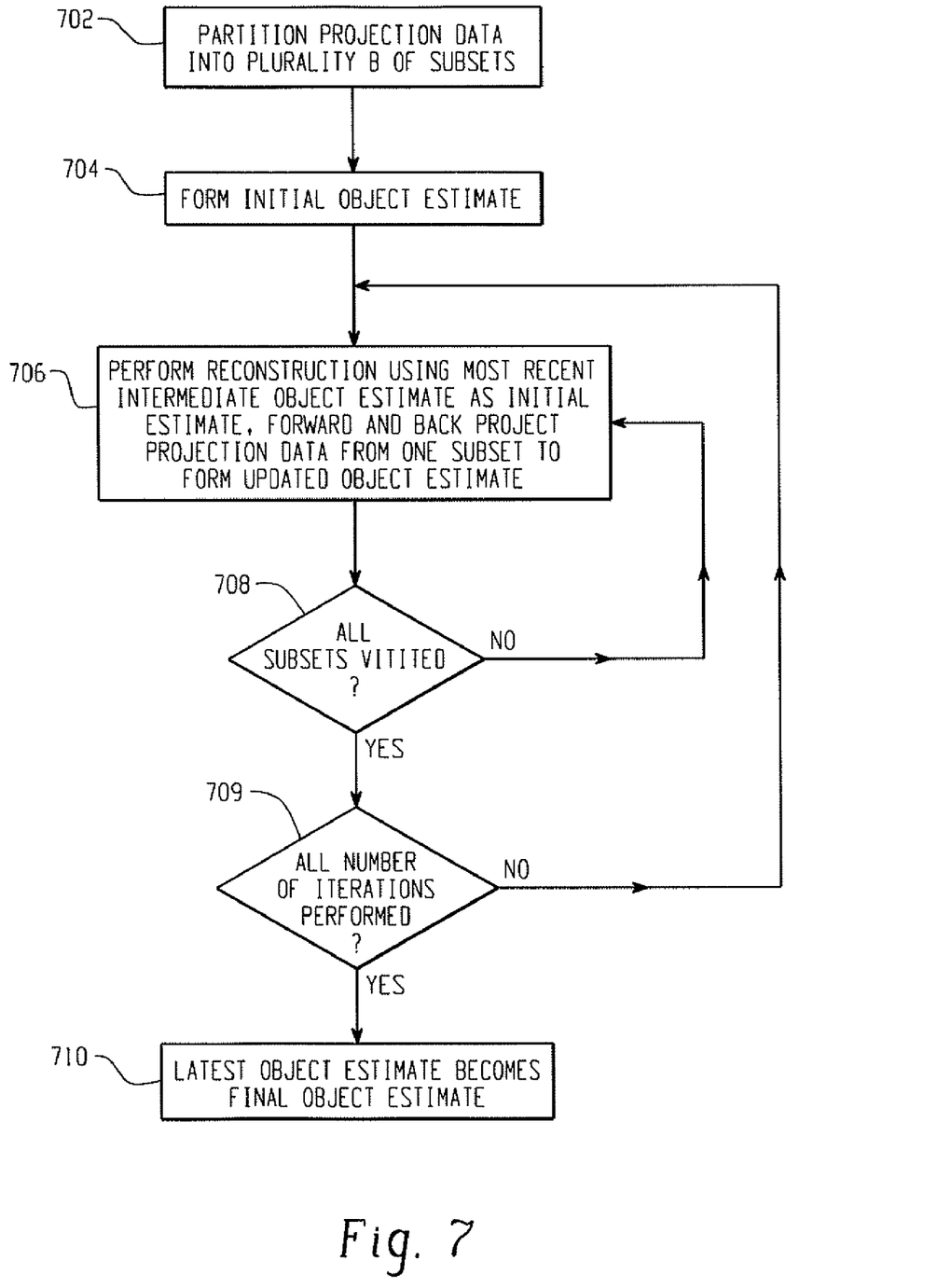
FIG. 7 is a flowchart of a reconstruction using subsets.

Subsets of the projection data can be used to speed up convergence. With reference to FIG. 7, the projection data is divided or partitioned into a plurality B of subsets at step 702. At 704, an initial object estimate, in which the voxels in the image are typically set to a constant value, is generated.

At 706, a forward and back projection is performed using the most recent object estimate and the projection data from the selected subset to generate an updated object estimate. As will be appreciated, the forward and back projection process can still be computationally expensive. The reconstruction process can be further accelerated by distributing the reconstruction of each subset among a plurality P of computers or computer processors, where P is greater than or equal to 2, as will be described in greater detail below. In one implementation, the object space is distributed among a plurality of processors. In another implementation the projection space is distributed among a plurality of processors. In any case, the reconstruction 706 generates an updated object estimate. Note that the object sensitivity s should also depend on the selected subset.

At 708, if all of the subsets have not been visited, the process returns to step 706, using the projection data from the next subset and the most recent object estimate. One iteration is complete when all of the subsets have been visited.

At 709, steps 706 and 708 are repeated until the object estimate converges or otherwise until a desired number of iterations have been performed. The most recent object estimate becomes the final object estimate at 710.

The final object estimate is stored in suitable memory and made available to the operator console computer 128 for further display, processing, and/or analysis. The reconstructed image data may also be made available to other computers associated with the scanner or otherwise having access to a common network such as a picture archiving and communication (PACS) system, hospital information system/radiology information system (HIS/RIS) system, the internet, or the like.

Figure 2A:
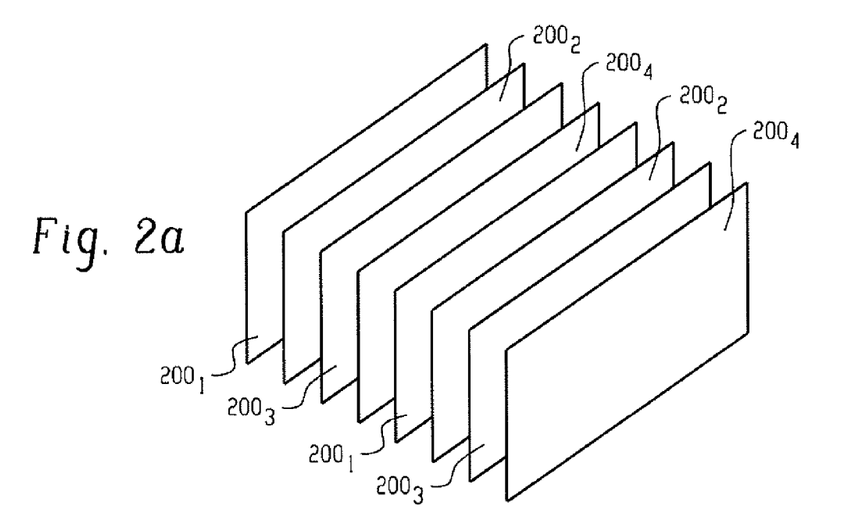
FIGS. 2a, 2b, 2c, and 2d depict distributions of object space among multiple processors.
Figure 2B:
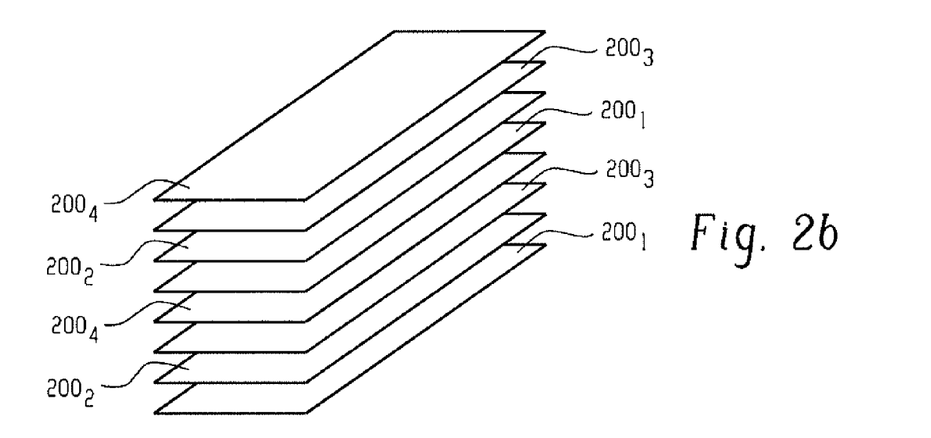
Figure 2C:
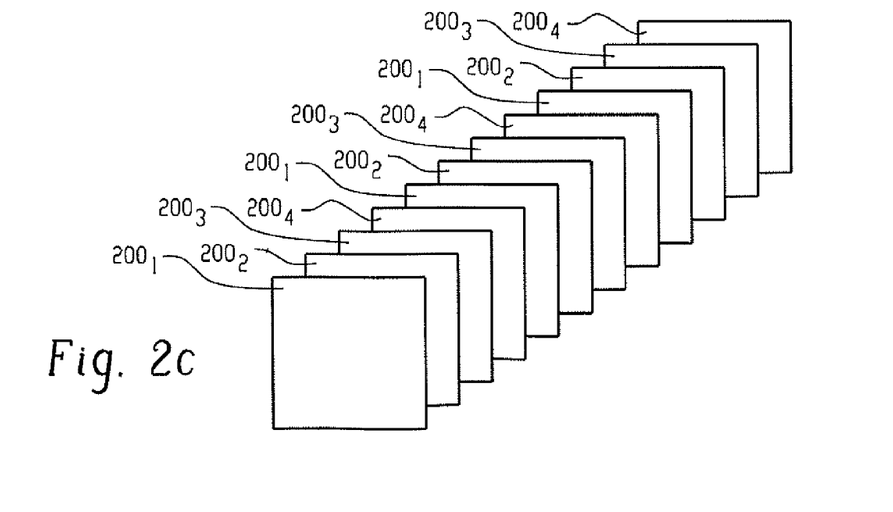

FIGS. 2a, 2b, and 2c depict a distribution of the object space 200 among multiple processors in a slice-wise fashion in an exemplary case where P=4. In this regard, it should be noted that the object space may be any desired basis function, for example voxels or blobs. The object space 200 may be distributed in any direction, for example in the horizontal or x-direction, the vertical or y-direction, the longitudinal or z-direction, or in an oblique direction. By way of example, FIG. 2a depicts the object space 200 distributed along the horizontal or x-direction, with object space portion 200₁ distributed to processor 1, object space portion 200₂ distributed to processor 2, object space portion 200₃ distributed to processor 3, and object space portion 200₄ distributed to processor 4 in an interleaved fashion. FIG. 2b depicts the object space 200 distributed among four processors in the vertical or y-direction. FIG. 2c depicts the object space distributed among four processors in the axial or z-direction.

Figure 2D:
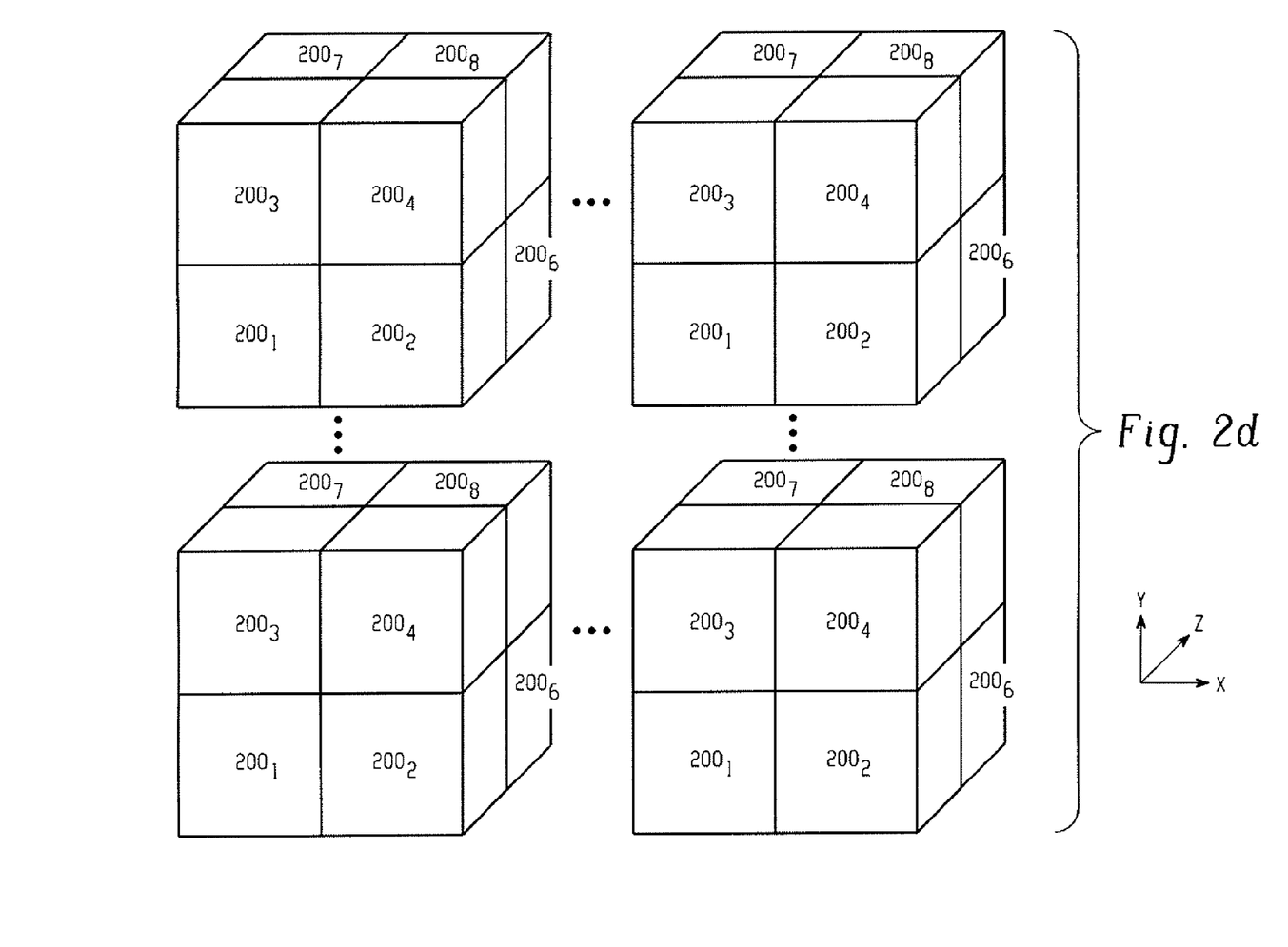

FIG. 2d depicts a distribution of the object space 200 among multiple processors in a volumetric or multi-dimensional fashion in an exemplary case where P=8. Assuming by way of illustration that the object space 200 contains 64×64×128 voxels or blobs, the voxels or blobs may be assigned to each processor as of follows:

| Processor Number | Object Space Assignment |
| --- | --- |
| 1 | 2i, 2j, 2k |
| 2 | 2i + 1, 2j, 2k |
| 3 | 2i, 2j + 1, 2k |
| 4 | 2i + 1, 2j + 1, 2k |
| 5 | 2i, 2j, 2k + 1 |
| 6 | 2i + 1, 2j, 2k + 1 |
| 7 | 2i, 2j + 1, 2k + 1 |
| 8 | 2i + 1, 2j + 1, 2k + 1 | where i=0~31, j=0~31, and k=0~63. Thus, object space portion 200₁ is distributed to processor 1, object space portion 200₂ is distributed to processor 2, object space portion 200₃ is distributed to processor 3, and so on.

The above object space distributions are exemplary only and other relatively even or uneven distribution schemes may also be implemented.

Figure 3:
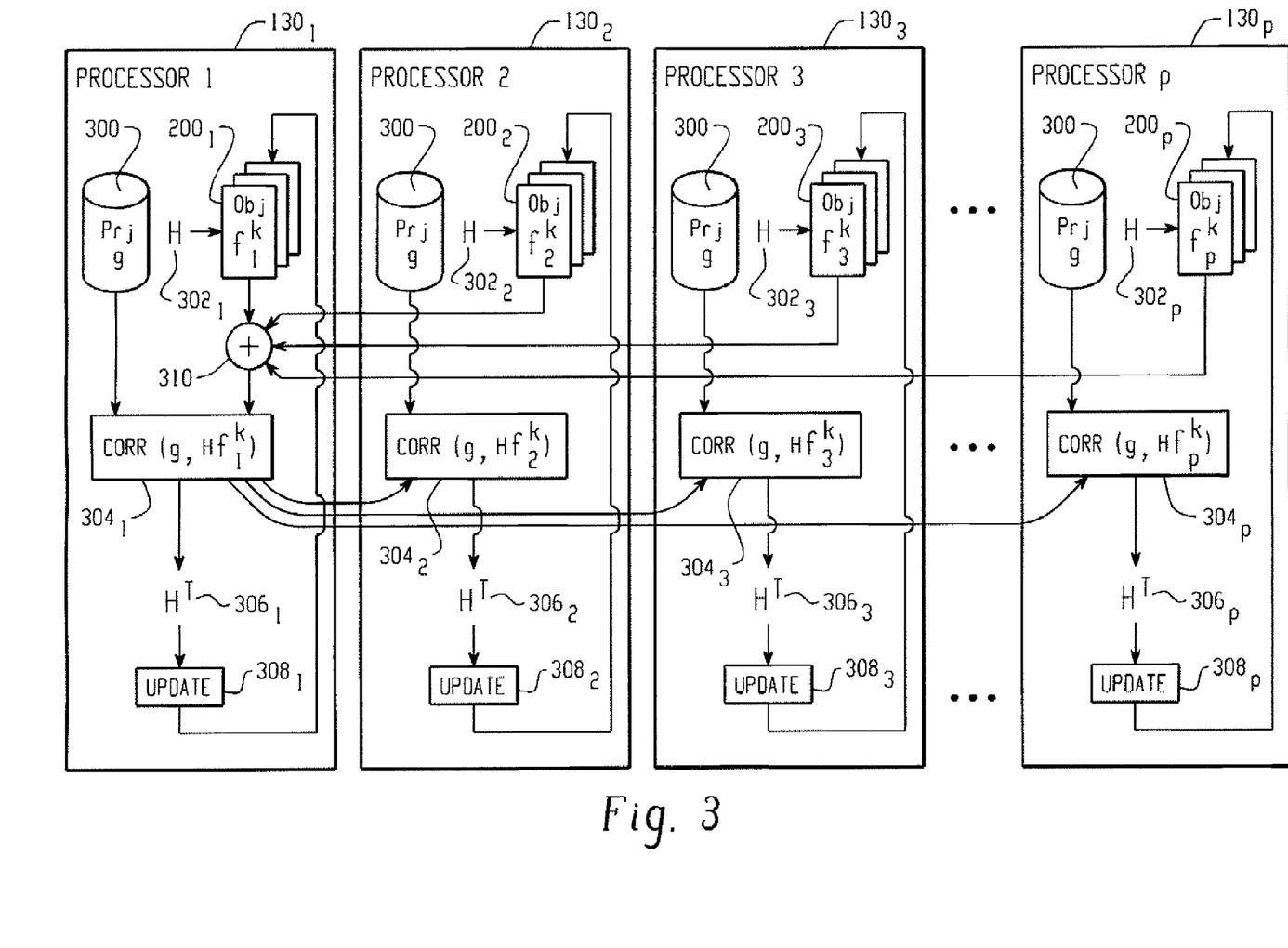
FIG. 3 depicts an iterative reconstruction with object space distributed among multiple processors.

Turning now to FIG. 3, each processor 130₁, 130₂, 130₃ ... 130ₚ, includes or has access to a memory which contains the entire projection data 300 for the relevant subset and an intermediate object estimate 200₁, 200₂, 200₃ ... 200ₚ corresponding to that processor's object space portion. Each processor also executes software or other instructions which implement forward projector 302, a corrector 304, a back-projector 306, and an update function 308. One of the processors 130₁ functions as a master processor and includes and object space combiner 310.

In FIG. 3, $\hat{f}_p^k$ denotes the $k^{th}$ object estimate at processor p, where $\hat{f}_p^k$ includes a plurality of voxels or blobs depending on the selected basis function. The combination of $\hat{f}_p^k$ from all P processors represents the estimate of the object space 200.

Figure 4A:
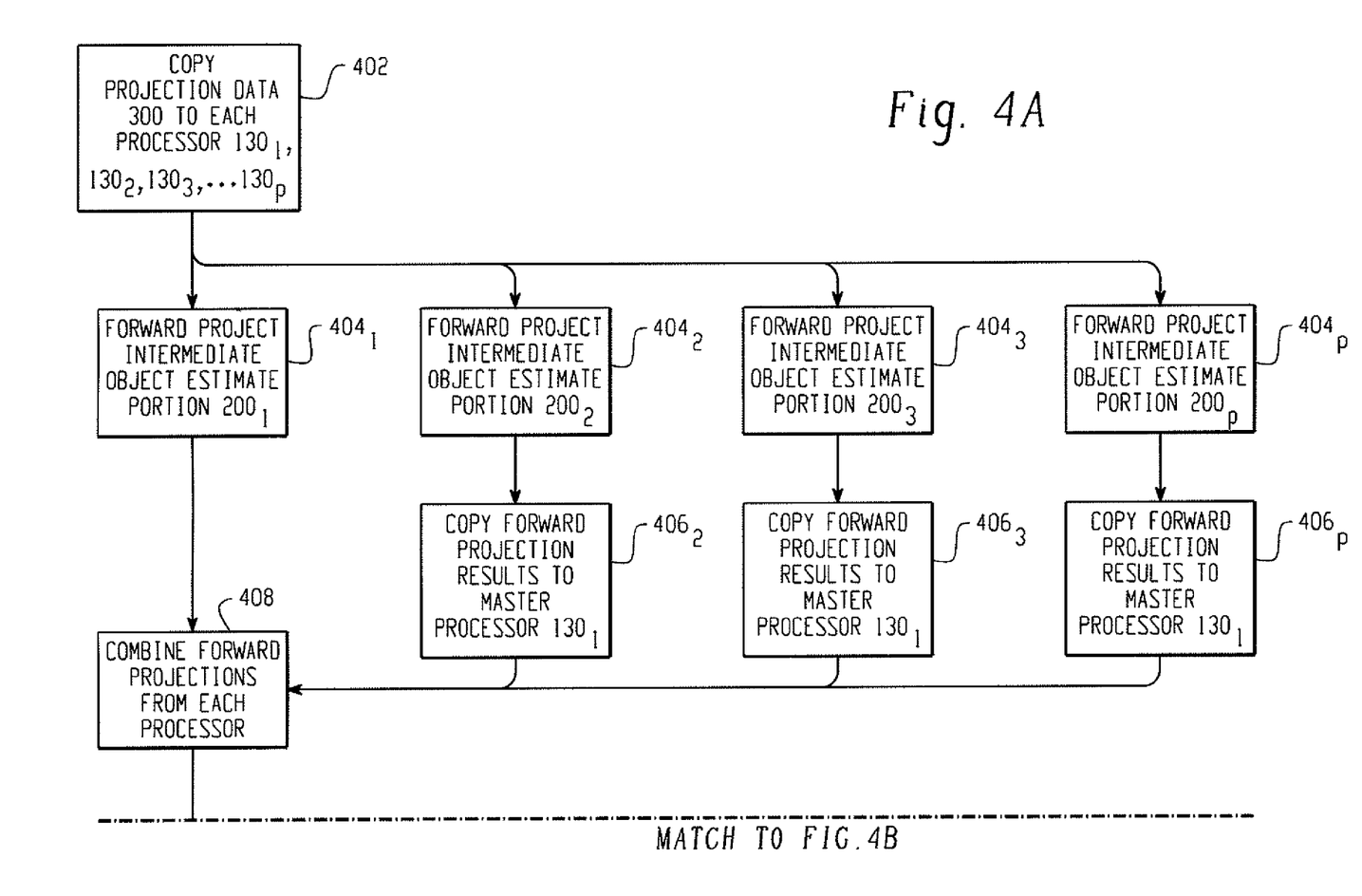
FIG. 4 is a flowchart of an iterative reconstruction with the object space distributed among multiple processors.
Figure 4B:
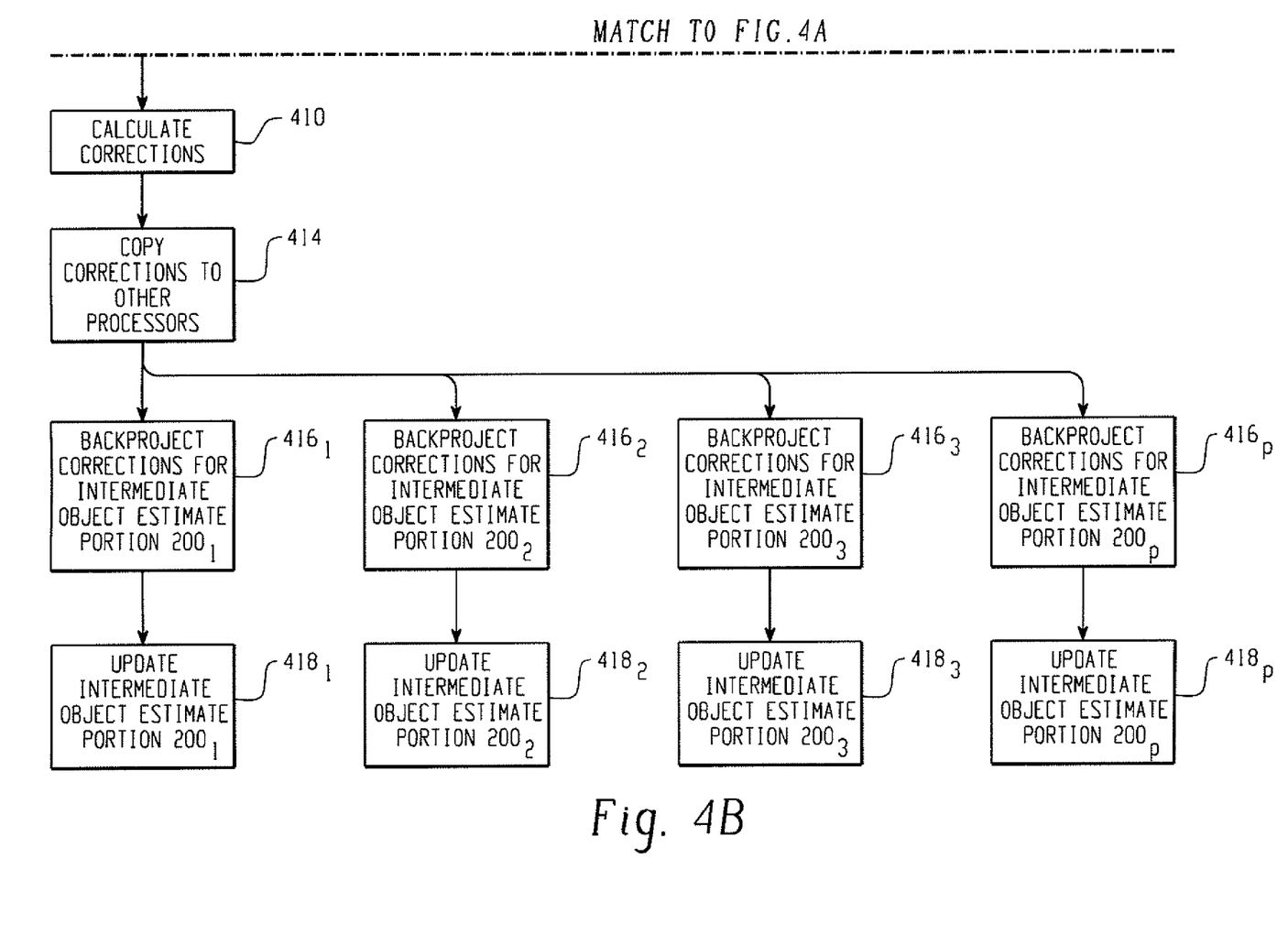

With reference to FIGS. 3 and 4, the processing of a subset will be further described. At 402, the projection data 300 corresponding to the subset is copied or otherwise made available to each processor 130.

At steps 404₁, 404₂, 404₃ ... 404ₚ, the forward projector 302 associated with each processor 130 forward projects the processor's respective portion 200₁, 200₂, 200₃ ... 200₄ of the intermediate object estimate 200.

At step 406, the results of the various forward projections are copied or otherwise made available to the master processor 130₁.

At step 408, the object space combiner 310 associated with the master processor 130₁ combines or sums the forward projections from the various processors 130 to produce an intermediate object estimate indicative of the combined object space 200.

At step 410, the corrector 304 associated with the master processor 130₁ calculates the corrections for the combined object space 200. The relevant portions of the combined corrections are copied or otherwise made available to the other processors $130_2$, $130_3$ ... $130_p$ at step 414.

At steps $416_1$, $416_2$, $416_3$ ... $416_p$, the backprojector 306 associated with each processor 130 backprojects the corrections for its portion $200_1$, $200_2$, $200_3$ ... $200_4$ of the object space.

At steps $418_1$, $418_2$, $418_3$ ... $418_p$, the update function 308 associated with each processor 130 updates the respective intermediate object estimate portion $200_1$, $200_2$, $200_3$ ... $200_4$ with the backprojected correction data. The intermediate object estimates are then used as the initial object estimate for the processing of the next subset at step 708 or for the next iteration at step 709, as the case may be.

In another implementation, the projection domain or space is divided among a plurality of processors. The projection domain may be represented as list mode or event-by-event data, sinogram or projection data, or in any other suitable manner.

The projection space may be distributed among the various processors 130 in a variety of ways. In the case of a list mode acquisition, the events can for example be distributed chronologically. In the case of a three dimensional sinogram or list mode acquisition, the events can be distributed geometrically.

The projections in each subset are preferably distributed evenly among the processors. In the case of a three dimensional list mode acquisition using chronologically ordered subsets, the events within each subset can be evenly distributed among the processors. In the case of a three dimensional sinogram or list mode acquisition using geometrically ordered subsets, the events within each subset can likewise be allocated among the various processors geometrically.

For example, where subsets are based on the transverse projection angle, projections having the same transverse angle but different azimuthal angles can be distributed among the various processors 130. In an example where the PET gantry 102 includes twenty nine (29) axial rings of detectors 106 and the reconstructor 129 includes P=6 processors, the distribution of events associated with a given set of transverse angles can be allocated among the various processors as a function of their azimuthal angle as follows:

| Processor Number | Ring Differential | Total Oblique Axial Rays |
| --- | --- | --- |
| 1 | 0 to ±2 | 139 |
| 2 | ±3 to ±5 | 150 |
| 3 | ±6 to ±8 | 132 |
| 4 | ±9 to ±12 | 148 |
| 5 | ±13 to ±17 | 140 |
| 6 | ±18 to ±28 | 132 |

Thus, in the above example, events having a relatively small azimuthal angle are assigned to processor 1, events having a relatively larger azimuthal angle are assigned to processor 2, and so on. As can be seen, the total number or axial rays assigned to each processor is approximately equal.

In another example where the subsets are based on the transverse projection angle, projections having the same transverse angle but different transverse positions can be distributed among the different processors 130. As yet another example, projections having the same transverse angle but different longitudinal or axial positions can be distributed among the various processors 130.

The projections can also be distributed as a function of their transverse angle. In an example where there are 192 transverse angles and sixteen (16) subsets, each subset includes twelve (12) transverse angles. Where the reconstructor 129 includes P=4 processors, each processor receives three (3) transverse angles per subset.

Other suitable equal or unequal distribution schemes may also be implemented.

In any case, a first projection space portion is assigned to processor 1, a second projection space portion is assigned to processor 2, a third projection space portion is assigned to processor 3, and so on.

Figure 5:
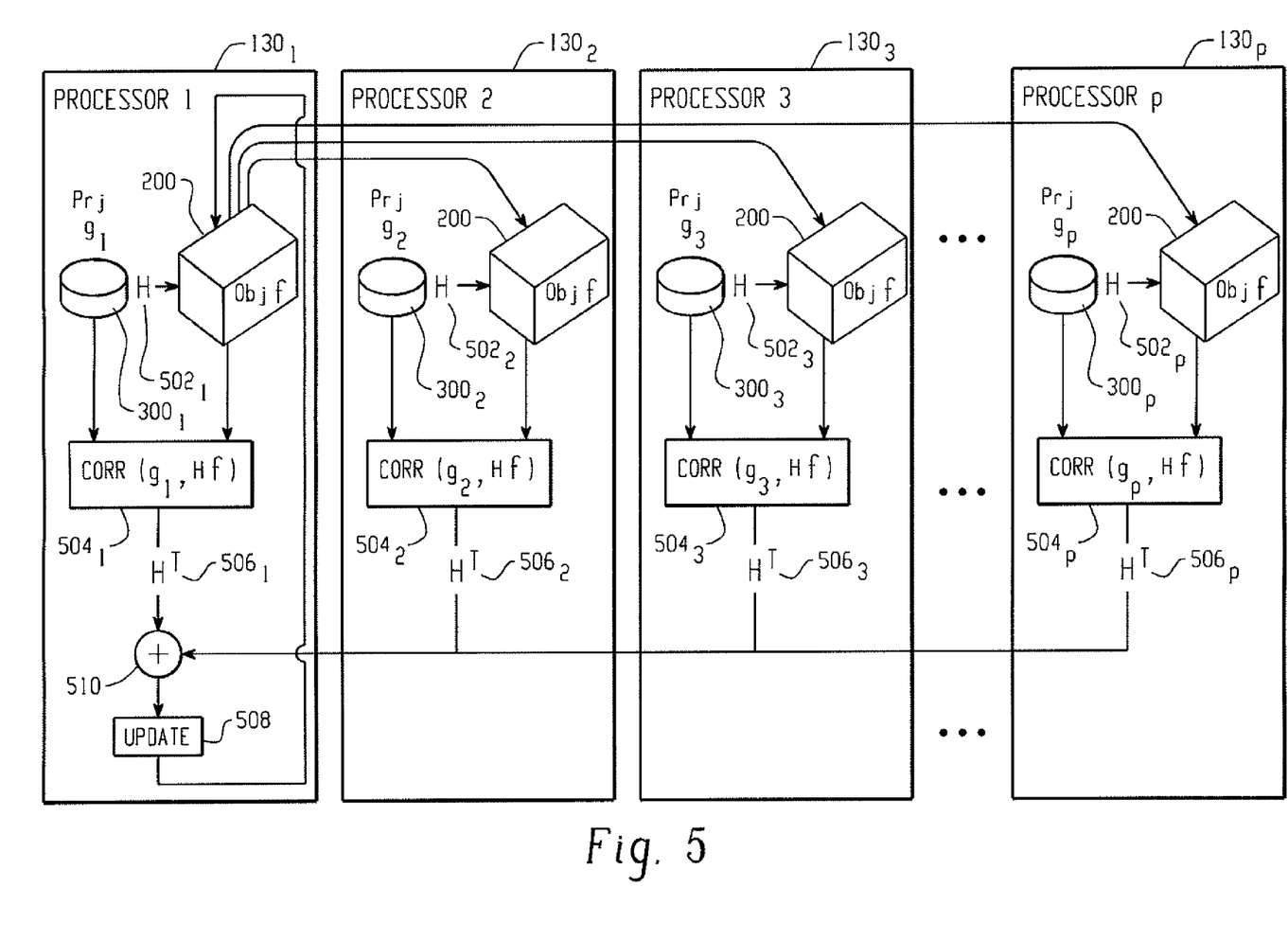
FIG. 5 depicts an iterative reconstruction with projection space distributed among multiple processors.

Turning now to FIG. 5, the projection space is distributed among p processors $130_1$, $130_2$, $130_3$ ... $130_p$. Each processor 130 includes or has access to a memory which contains the entire object estimate 200 and the projection data corresponding to that processor's projection space portion $300_1$, $300_2$, $300_3$ ... $300_p$. Each processor 130 also executes software or other instructions which perform a forward projector 502, a corrector 504, backprojector 506, and an image space update function 508. One of the processors $130_1$ functions as a master processor and includes an object space combiner 510.

In FIG. 5, $g_p$ denotes projection space portion assigned to processor p. The combination of object space portion $g_p$ from each processor represents the complete projection space 300.

Figure 6A:
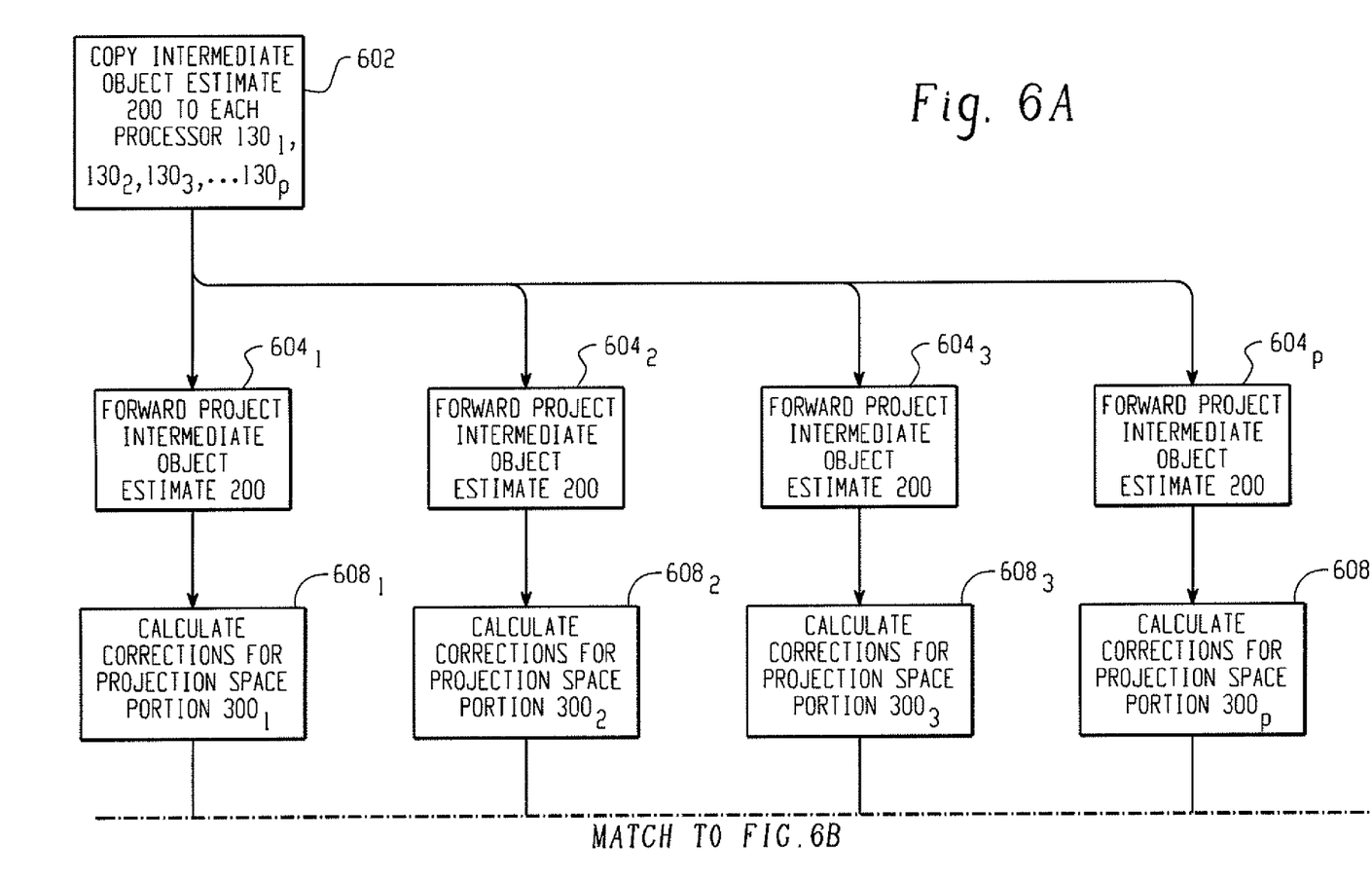
FIG. 6 is a flowchart of an iterative reconstruction with projection space distributed among multiple processors.
Figure 6B:
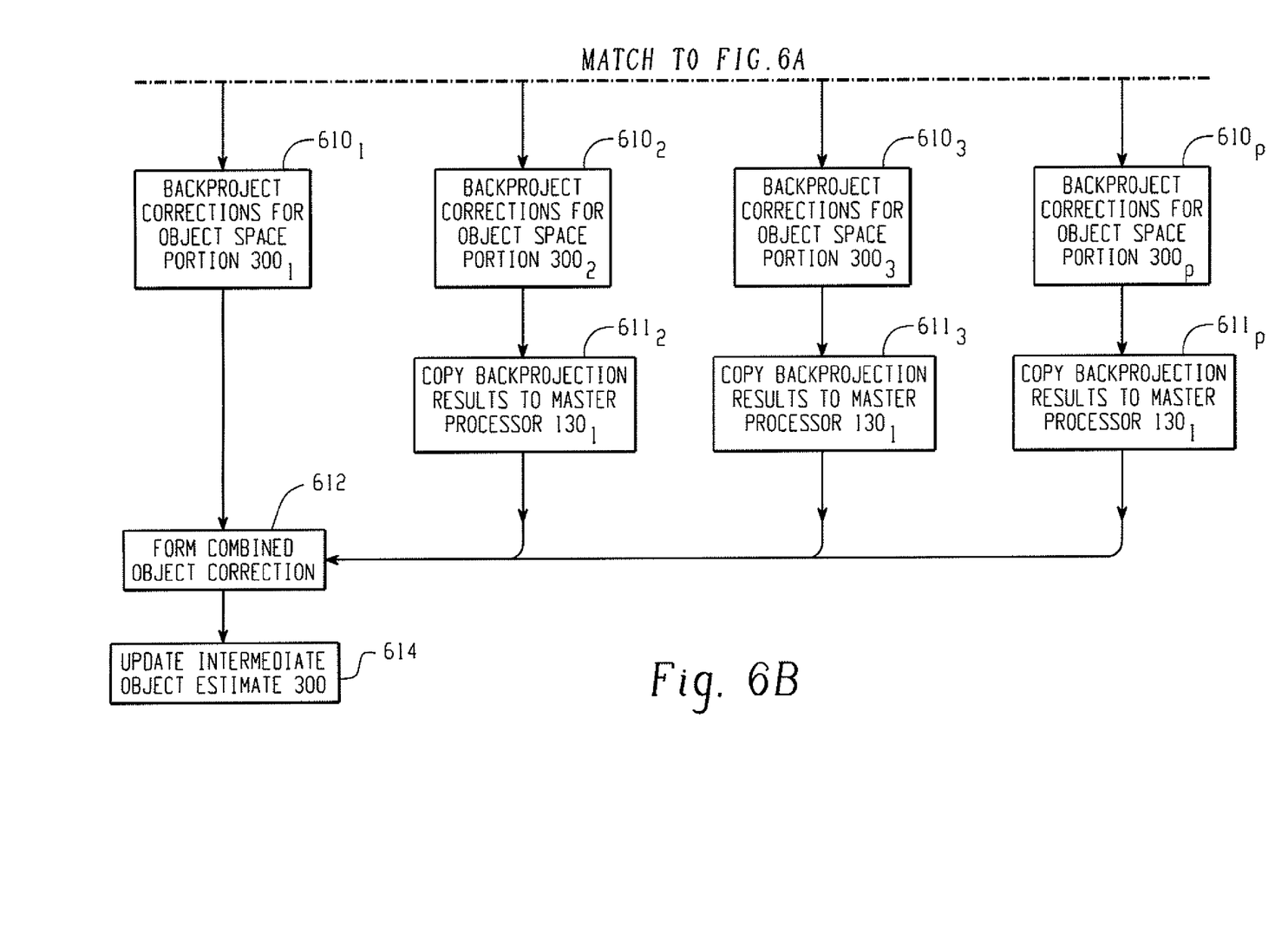

With reference to FIGS. 5 and 6, the processing of a subset will now be described. The measured projection 300 data associated with a particular subset is initially copied or otherwise made available to each processor, where processor $130_1$ receives measured projection portion $300_1$, processor $130_2$ receives measured projection portion $300_2$, and so on.

At step 602, an intermediate object estimate 200 is copied or otherwise made available to each processor 130. At steps $604_1$, $604_2$, $604_3$ ... $604_p$, the forward projector 502 associated with each processor 130 forward projects the then-current intermediate object estimate 200.

At steps $608_1$, $608_2$, $608_3$ ... $608_p$, the corrector 504 associated with each processor 130 calculates the correction projections corresponding to the projection space portion $300_1$, $300_2$, $300_3$ ... $300_p$ allocated to that processor 130.

At steps $610_1$, $610_2$, $610_3$ ... $610_p$, the backprojector 506 associated with each processor 130 backprojects the correction information for its projection space portion $300_1$, $300_2$, $300_3$ ... $300_p$.

At steps $611_2$, $611_3$ ... $611_p$, the results of the various backprojections are copied or otherwise made available to the master processor $130_1$.

At step 612, the object space combiner 510 associated with the master processor $130_1$ combines or sums the corrections from each portion of the projection space 300 to form a combined correction for the object space 200.

At step 614, the update function 508 associated with the mater processor $130_1$ updates the intermediate object estimate 200 with the combined correction data. The most recent intermediate object estimate 200 is used as the initial object estimate for the reconstruction of the next subset at step 708 or for the next iteration at step 709, as the case may be.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A method of reconstructing projection data indicative of a plurality of portion annihilation events, the method comprising:

(a) distributing each of a plurality of subsets of the projection data into at least a first portion and a second portion;

(b) concurrently performing reconstruction operations on the first portion using a first processor and on the second portion using a second processor, the reconstruction operations being performed concurrently by each of the first and second processors including:
  (i) forward projecting an object estimate with each of the first and second processors,
  (ii) with the first processor, using the forward projection of the object estimate and the first portion of the subset of the projection data to calculate a first correction, and with the second processor using the forward projection of the object estimate and a second portion of the subset to calculate a second correction;
  (iii) backprojecting the first and second corrections and updating the object estimate in accordance with the backprojected first and second corrections such that the object estimate used by the first processor and the second processor is updated from backprojected corrections from both the first and second processors;
(c) repeating steps (b)(i), (b)(ii), (b)(iii) a plurality of times on each of the plurality of subsets to iteratively update the object estimate;
(d) repeating steps (a), (b), and (c) on each of the subsets to iteratively update the object estimate;
(e) generating a human readable image indicative of the iteratively update object estimate.

2. The method of claim 1 wherein the subset of the projection data contains a plurality of projections and wherein the first and second portions of the subset include an approximately equal number of projections.

3. The method of claim 1 wherein the subset of the projection data contains a plurality of projections and wherein the projections are distributed between the first and second portions of the subset as a function of the azimuthal angle of the projections.

4. The method of claim 1 wherein the subset of the projections data contains a plurality of projections and wherein the projections are distributed between the first and second portions of the subset as a function of the transverse angle of the projections.

5. The method of claim 1 wherein the subset of the projection data contains a plurality of projections and wherein the projections are distributed between the first and second portions of the subset as a function of the transverse position of the projections.

6. The method of claim 1 wherein the subset of the projection data contains a plurality of projections and wherein the projections are distributed between the first and second portions of the subset as a function of the longitudinal position of the projections.

7. The method of claim 1 wherein the projection data includes a plurality of projections and wherein the projections are distributed between the subsets as a function of the transverse angle of the projections.

8. The method of claim 1 wherein updating the object estimate includes concurrently using the first processor to backproject the first correction and using the second processor to backproject the second correction.

9. The method of claim 1 wherein the first and second processors are disposed in separate first and second general purpose computers.

10. The method of claim 1 including using a third processor to perform a third portion of the reconstruction of the subset of the projection data and using the results of the third portion of reconstruction to update the object estimate.

11. A computer readable medium carrying a computer program which controls a computer to carry out the method of claim 1.

12. A method of reconstructing projection data indicative of a plurality of positron annihilation events, the method comprising:
  distributing each of a plurality of subsets of the projection data into at least a first portion and a second portion;
  concurrently performing reconstruction operations on the first portion using a first processor channel and on the second portion using a second processor channel, the reconstruction operations being performed concurrently by each of the first and second processor channels including:
    forward projecting an object estimate with each of the first and second processor channels,
    with the first processor channel, using the forward projection of the object estimate and the first portion of the subset of the projection data to calculate a first correction, and with the second processor channel using the forward projection of the object estimate and a second portion of the subset to calculate a second correction;
  updating the object estimate including using the first processor channel to backproject the first correction for the first portion of the subset of the projection data and the second processor channel to backproject the second correction for the second portion of the subset of the projection data;
  repeating the steps of using the first processor and the second processor to update the object estimate for each of the plurality of subsets;
  generating a human readable image indicative of the object estimate.

13. The method of claim 12 including concurrently using the first and second processor channels to forward project the first and second corrections.

14. A computer readable medium carrying a computer program which controls a computer to carry out the method of claim 12.

15. A method of reconstructing projection data indicative of a plurality of positron annihilation events, the method comprising:
  (a) copying each of a plurality of subsets of the projection data to each of a plurality of processors, each processor corresponding to a different portion of an object estimate;
  (b) with each of the plurality of processors, concurrently and independently forward projecting the corresponding object estimate portion;
  (c) combining the forward projections of the object estimate portions;
  (d) calculating corrections from the subset of the projection data and the combined forward projections;
  (e) copying the corrections to each of the plurality of processors;
  (f) with each of the processors, concurrently and independently backprojecting the corrections and updating the corresponding portion of the object estimate with the backprojected corrections; and
  (g) repeating steps (a)-(f) for each of a plurality of subsets of the projection data.

16. The method of claim 15 wherein the portions of the object estimate are distributed to the processors on a slicewise basis.

17. The method of claim 15 wherein the portions of the object estimate are distributed to the processors on a volumetric basis.

18. A computer readable medium carrying a computer program which controls a computer to carry out the method of claim 15.

19. The method of claim 15, further including:
generating a human readable image of the object estimate.

20. An apparatus for reconstructing projection data indicative of a plurality of positron annihilation events detected during a positron emission tomography scan, the apparatus comprising:
a first processor for performing reconstruction operations on a first portion of a subset of the projection data, the first processor being programmed to:
receive a copy of an object estimate,
forward project the object estimate,
calculate a first correction based on the forward projection of the object estimate and the first portion of the projection data subset,
backproject the first correction; and
a second processor for performing the reconstruction operations on a second portion of the subset of the projection data, the second processor being programmed to:
receive a copy of the object estimate,
forward project the object estimate,
calculate a second correction based on the forward projection of the object estimate and the second portion of the projection data subset,
backproject the second correction; and
a means for one of:
combining the first and second corrections to form a combined object correction, backprojecting the combined object correction, and updating the object estimate with the backprojected combined object correction; and
backprojecting the first and second corrections, combining the backprojected corrections, and updating the object estimate with the backprojected corrections.

21. An iterative method of reconstructing projection data indicative of detected radiation, the method comprising:
(a) receiving a plurality of subsets of the projection data;
(b) distributing each of the subsets into a plurality of portions;
(c) with each of a plurality of processors, performing temporally in parallel reconstruction operations on a corresponding one of the subset portions, the reconstruction operations including:
forward projecting an object estimate,
comparing the forward projected object estimate with the corresponding subject portion to generate a corresponding correction, and
backprojecting the corresponding corrections;
(d) combining the backprojected corrections from the plurality of processors to form a combined object correction;
(e) updating the object estimate with the combined object correction;
(f) repeating steps (b)-(e) for the plurality of sets of projection data.

22. The method of claim 21, further including updating steps (b)-(e) for each subset.

23. The method of claim 21 wherein the subset of the projection data includes a plurality of projections and wherein the projections are distributed between the plurality of portions of the subset as a function of the azimuthal angle, transverse angle, or transverse position of the projections.

24. The method of claim 23 wherein each of the portions of the subset include an approximately equal number of projections.

25. A computer readable medium carrying a computer program which controls a computer to carry out the method of claim 21.

26. The method of claim 21, further including:
generating a human readable image of the object estimate.

27. An apparatus for reconstructing data indicative of a plurality of positron annihilation events detected during a positron emission tomography scan which generates a plurality of subsets of projection data, the apparatus comprising:
a plurality of reconstruction processors, each processor including:
an input on which a portion of each subset of the projection data is received,
a data storage which stores at least an object estimate,
a forward projection function which forward projects the object estimate,
a comparing function that combines the input projection data and the forward projected object estimate to generate a correction,
a backprojection function that backprojects the corrections,
a combining function which one of (1) combines the corrections from the plurality of processors and supplies the combined corrections to the backprojecting function or (2) combines backprojected corrections from the plurality of processors, and
an updating function which updates the object estimate in the data storage with one of (1) the backprojected combined corrections from the backprojection function or (2) the combined backprojected corrections from the combining function,
such that the object estimate is iteratively updated in each processor based on backprojected corrections from the plurality of processors as the subsets of the projection data are received.

28. An apparatus for reconstructing data indicative of a plurality of positron annihilation events detected during a positron emission tomography scan which generates a plurality of subsets of projection data, the apparatus comprising:
a plurality of reconstruction processors each of which receives a portion of each of the subsets of projection data and iteratively over each of a plurality of iterations updates an object estimate, the reconstruction processors being interconnected to exchange partially processed data with each other in each iteration;
a memory which holds the object estimate that has been iteratively updated with the plurality of subsets of projection data.

* * * * *